April 9, 1957  F. B. BURNS  2,788,518
DIFFERENTIAL SPEED DETECTION
Filed March 3, 1954  2 Sheets-Sheet 1

INVENTOR
*Fredrick B. Burns*

BY *Cushman, Darby & Cushman*
ATTORNEYS

April 9, 1957  F. B. BURNS  2,788,518
DIFFERENTIAL SPEED DETECTION
Filed March 3, 1954  2 Sheets-Sheet 2
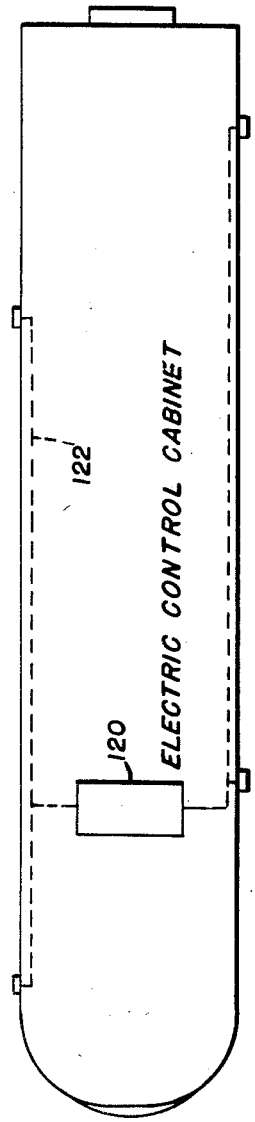
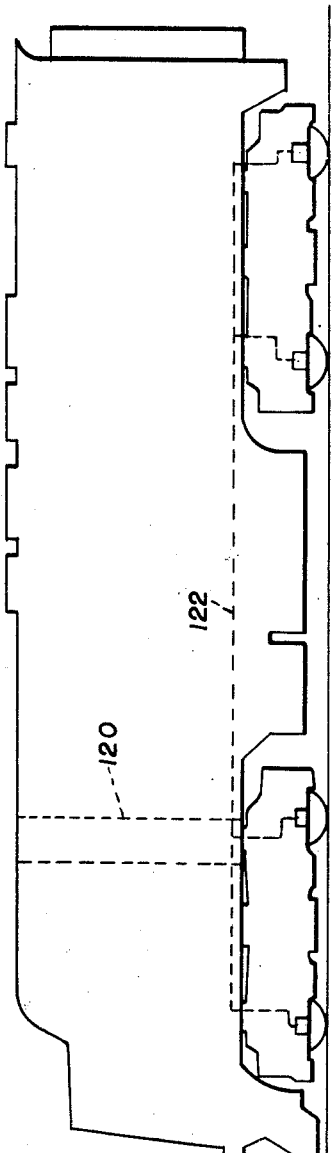
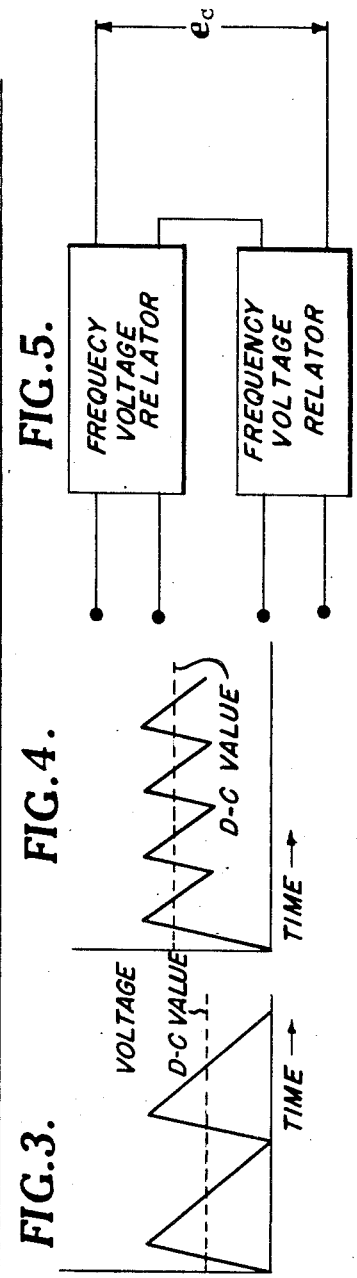
INVENTOR
*Fredrick B. Burns*
BY *Cushman, Darby & Cushman*
ATTORNEYS and Patent Office
2,788,518
Patented Apr. 9, 1957

2,788,518

DIFFERENTIAL SPEED DETECTION

Fredrick B. Burns, Springfield, Mo.

Application March 3, 1954, Serial No. 413,789

5 Claims. (Cl. 340—268)

This invention pertains to methods and apparatus for detection of speed differentials between dynamoelectric machines when such machines are group-operated. The invention has particular application to the detection of wheel slip and slide in railroad locomotives having groups of wheels driven by discrete electric motors. Certain features of the invention are directed to such locomotives, although the invention is of wider application.

According to the invention a voltage having a component representing commutator ripple is derived by connection into the circuit of each of the motors of the group. Each separate commutator ripple voltage from each machine is applied to a circuit which at its output produces a signal proportional to the frequency of the ripple voltage. Circuit means are provided for comparing the voltages proportional to ripple frequency, to operate indicating lamps and/or control devices whenever speed differentials occur.

While the invention is applicable to groups of motors whatever their use may be, the invention is particularly important to solving problems of so-called wheel slip and slide in locomotives. Accordingly, both the general and detailed description of the invention in this application will proceed with particular reference to locomotives. The following discussion will be directed particularly to problems encountered in the currently popular diesel-electric locomotives now in very extensive use on railroads in the United States and in other countries.

In the popular designs of diesel-electric motors, two or more and usually four trucks on each locomotive have wheels driven by being geared to separate direct-current motors. The electric motors are in turn energized from direct-current generators which are directly connected to diesel engines.

At the present time two fundamental methods of wheel slip and slide detection are employed, neither of which is entirely satisfactory. These methods may be classified as (1) systems operating in response to motor electrical unbalance, and (2) systems operating in response to wheel-connected tachometers. The systems operating in response to motor electrical unbalance rely on the differential of armature voltages between two or more motors. A similar system may also operate on current unbalance through the motor armatures. In either case, a current or voltage opposition is established through an indicating and/or correction device so that changes in current or voltage will cause an actuation of the indicator or control device.

The second fundamental system, relying on wheel-connected tachometers, indicates operational irregularities directly as a function of speed. Small generators are directly mounted on the wheels of the locomotive and the voltages produced therefrom are directly proportional to the speed of the wheels. Voltage so derived may be matched with a voltage derived from another wheel generator and the different voltage presented across the energizing winding of a relay.

There are major disadvantages to both types of known systems. As for detecting comparative armature voltages or currents, the motors will operate variably between extreme speed limits. Therefore, a speed versus armature current or voltage curve is not a straight line but is more in the nature of a hyperbola. It is apparent from the complexities of such relationship that there is no simple quantitative determination between speed and armature current. Another inherent disadvantage to this type of detection method is the flexibility which must be incorporated to operate for both series-parallel motor combinations, and parallel combinations which normally are used for locomotive speed transition. Furthermore, it should be noted that a locomotive unit must be in operation in order to indicate wheel lock. Practice on American railroads is believed to have experimentally proven that devices operating on the motor unbalance principle are on the whole entirely inaccurate.

As for the method using wheel-connected tachometers, there are disadvantages of considerable magnitude. First, there is the high installation cost and, second, the inherent detailed maintenance program which must be associated with such a complex system. Third, there is the high probability of failure which is obvious with equipment requiring many moving parts and extensive auxiliary electrical circuits. These economical factors have kept wide acceptance of tachometer type devices to a minimum.

Modern diesel-electric locomotives are invariably provided with electrical control and terminal cabinets in the vicinity of the operator's station. All of the leads from the motor armatures, fields and other components are already collected in these cabinets when the locomotive is manufactured. By my invention, which will be described in detail hereinbelow, the entire additional circuitry which is required can be assembled into a convenient package which can be readily mounted in the vicinity of the existing control cabinets and "plugged in" or otherwise readily attached to the existing circuitry. There is no need to run additional cables from the body of the locomotive through the flexible mountings to the locomotive trucks. Therefore, whether a locomotive is already in use, or is being newly manufactured, the entire matter can be more efficiently taken care of. The additional cost and expense of equipping locomotives already in use cannot be over-emphasized. Modern locomotives are extremely expensive and the railroads can finance the acquisition of such equipment only by keeping it constantly in use. Every day that a locomotive is taken out of service for modifying to incorporate it in a wheel slip and slide detector is very costly. Similarly, every hour that a locomotive is taken out of service for maintenance of a given component, such as a wheel slip and slide detector, is expensive. By the present invention, as already stated, the wheel slip and slide detector may be a plug-in package. Therefore, a locomotive can be originally equipped very quickly and can be repaired even while it is in operation, the only necessary work being in the control cabinet. As for maintenance, a given package unit may be quickly removed and replaced with another and the unit then taken to repair shops for overhaul.

It is, accordingly, a primary object of this invention to provide an improved apparatus for detection of diesel-electric machine speed irregularities relative between machines when group-operated.

It is a further object of my invention to provide such speed irregularity detection by use of ripple frequency.

It is a further object of my invention to provide improved compact and readily replaceable wheel slip and slide detector apparatus for locomotives driven by a plurality of discrete motors mechanically coupled to discrete groups of driving wheels.

Further objects and the entire scope of the invention will be in part expressed and in part obvious from the following detailed description and from the appended claims.

The invention may be best understood by reference to the accompanying drawings, in which:

Figure 3 shows a voltage waveform obtained in the operation of the invention.

Figure 4 shows another voltage waveform obtained in the operation of the invention.

Figure 5 shows two opposed voltage relator circuits according to the invention.

Figure 6 shows a diagrammatic top plan view of a locomotive equipped with the invention.

Figure 7 shows a side elevational view of the locomotive of Figure 6.

Figure 1:
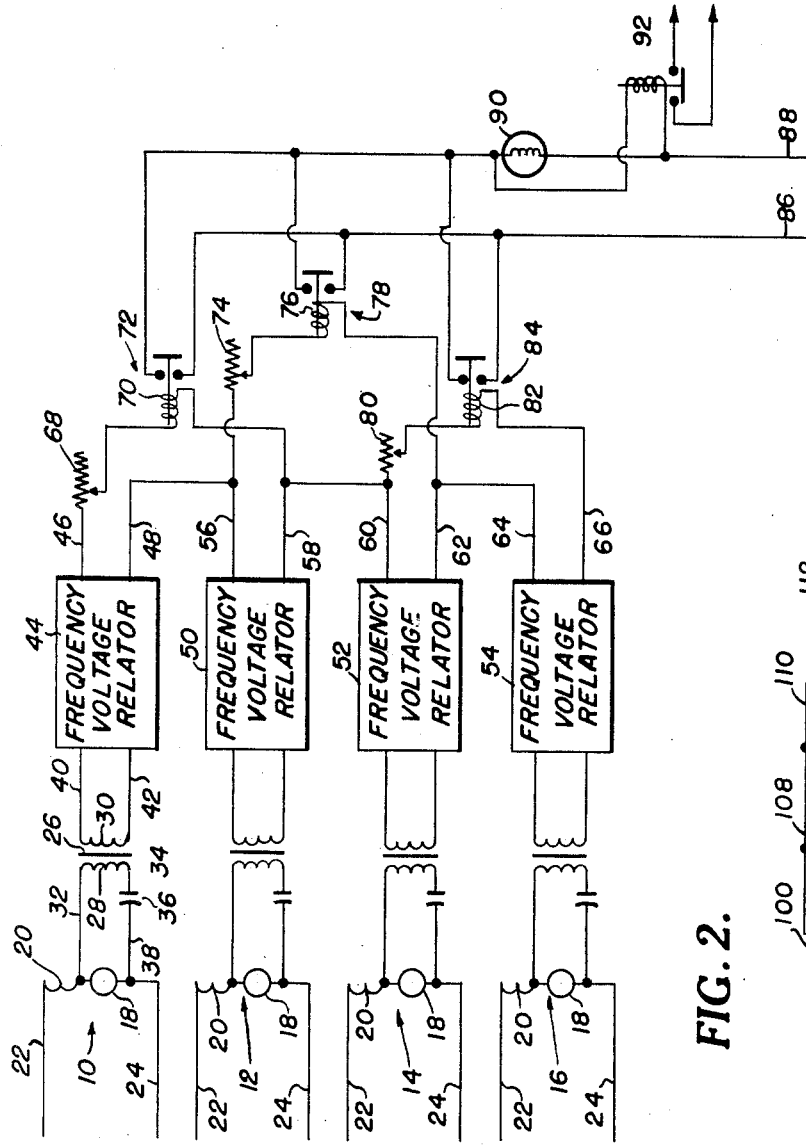
Figure 1 shows a system according to the invention.

The basic circuit of the invention is shown in Figure 1. Reference characters 10, 12, 14 and 16 generally designate discrete dynamoelectric machines which may be driving members mechanically coupled to the electric circuit of lomomotive driving wheels or any other objects to be driven. Each of machines 10, 12, 14 and 16 is provided with an armature 18 and field winding 20 and may be provided with electric power through conductors 22 and 24.

Referring to machine 10 as exemplary, a transformer 26 is provided having a primary winding 28 and secondary winding 30. One lead designated 32 connected with the primary winding 28 is connected to one side of the armature 18 of motor 10. The other lead 34 connected to primary winding 28 is connected to a capacitor 36. A lead 38 connects the capacitor to the opposite side of armature 18. For the purposes of the invention, although not shown in the drawing, the lead 38 may alternatively be connected to the end of field winding 20 remote from the connection of the field winding to previously-mentioned lead 32.

Leads 40 and 42 connect the transformer secondary winding 30 to a frequency voltage relator circuit 44, the function of which is to convert frequency to a proportionate direct-voltage level, as will be explained more fully hereinbelow. The output of the voltage relator circuit 44 appears on leads 46 and 48.

As may be readily observed in Figure 1, the machines 12, 14 and 16 are interconnected to frequency voltage relator circuits 50, 52 and 54, respectively, in exactly the manner already described in detail in connection with machine 10. The output of the relator circuit 50 is on leads 56 and 58, the output of relator circuit 52 is on leads 60 and 62, and the output of relator circuit 54 is on leads 64 and 66.

Between the relator circuits 44 and 50, leads 48 and 56 are directly interconnected and leads 46 and 58 are interconnected through a rheostat 68 and relay coil 70 of a relay designated generally as 72. Between relator circuits 50 and 52, the leads 58 and 60 are directly connected together and leads 56 and 62 are connected together through a rheostat 74 and coil 76 of a relay designated generally as 78. Between voltage relator circuits 52 and 54, the leads 62 and 64 are directly connected together and the leads 60 and 66 connected together through a rheostat 80 and coil 82 of a relay designated generally as 84.

Conductors 86 and 88 are provided to supply a source of power for operating one or both of an indicating lamp 90 and a control instrumentality 92, for example, a relay. The circuit through lamp 90 or instrumentality 92 may be completed by closing any one or more of previously-mentioned relays 72, 78 or 84.

Figure 2:
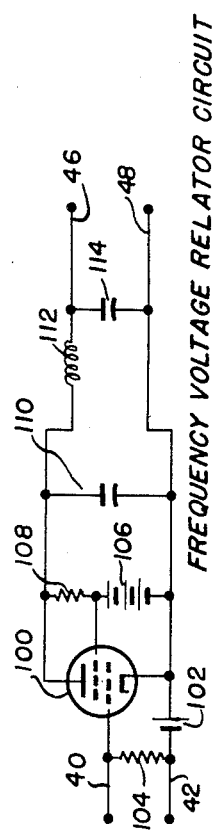
Figure 2 shows a frequency voltage relator used with the invention.

An exemplary circuit for use as voltage relator circuits 44, 50, 52 and 54 is shown in Figure 2, it being understood that other equivalent circuits may be employed.

A four-element electronic tube 100 is connected to operate as an electric switch and is controlled through grid bias imposed by grid bias battery 102 and resistor 104 by commutator ripple voltage on leads 40 and 42 (to refer to relator circuit 44 as an example). The bias is so selected that the tube 100 will be conductive for a part of the ripple voltage swing, but not for another part thereof. As will be noted in Figure 2, a B-voltage is supplied by battery 106 and the excursion of the tube anode is represented by a voltage drop across anode resistor 108. During the portion of the ripple voltage swing which causes the tube to be non-conductive, a capacitor 110 is charged by the potential source 106 through the plate resistor 108. When the tube 100 conducts, the capacitor discharges through the tube. This produces an output voltage of a general sawtooth form, as shown in Figure 3. The rapidity or frequency of charge-discharge will determine the effective or D. C. voltage output, as will be well understood by those skilled in the art and as is shown in Figure 4. An inductor 112 and capacitor 114 connected as shown in Figure 2 will provide on conductors 46 and 48 (again taking voltage relator circuit 44 as an example) the D. C. component of the sawtooth wave.

It will be apparent that as the frequency of the voltage applied on conductors 40 and 42 changes, the charging time of the capacitor 110 will change, resulting in a different, but proportionally different, level of a D. C. voltage on the conductors 46 and 48. Thus, a circuit is provided which converts frequency into proportional voltage level.

It will now be apparent that if two circuits of the type shown in Figure 2 are connected in opposition, as shown in Figure 5, the differential voltage $e_e$ will exist only when a difference in input frequency exists, and the magnitude of the voltage $e_e$ will be in proportion to the differential in the input frequencies. The analogy between the interconnection of two circuits as shown in Figure 5 and the interconnection of the relator circuits 44, 50, 52 and 54 in Figure 1 will be immediately apparent.

It is thought that the operation of the circuit of Figure 1 will be apparent from the foregoing description. However, the operation may be briefly analyzed as follows: If it be first assumed that all of the machines 10, 12, 14 and 16 are operating at equal speeds, there will be no difference in the D. C. output voltage of any of the frequency relator circuits 44, 50, 52 and 54. However, should machine 10, for example, change its speed either to decrease or increase its speed in relation to the other machines, there will be immediately a difference in output between voltage relator circuits 44 and 50, resulting in the closing of relay 72. Similarly, a change in speed of machine 12 with respect to the other machines will cause energization of relay 76. Further, any change in speed on the part of either machine 14 or 16 with respect to the others will cause energization of relay 84. Since relays 72, 76 and 84 are in parallel across power source leads 86 and 88, actuation of any one or more will cause energization of indicator lamp 90 and/or operation of device 92. Due to the progressive interconnection of the relator circuits as shown, it is impossible for any two or more of the machines to change speed in relation to the others without detection.

While the velocity of the machines does not effect the accuracy of the detection system, nevertheless, the relays 72, 76 and 78 could be made amplitude responsive, if desired, to reflect velocity.

The convenience of modifying a Diesel-electric locomotive in accordance with my invention is made readily apparent by reference to Figures 6 and 7 which diagrammatically show top and side views, respectively, of a representative locomotive. As has been mentioned generally hereinabove, locomotives as now constructed and as now in service are provided with electrical control and terminal panels usually in the vicinity of the block shown in Figures 6 and 7 and designated by reference character 120. Since all of the leads to the motors are already collected in the control and terminal cabinet 120, all that is necessary is to assemble the frequency relator circuits 44, 50, 52 and 54 and the associated transformers 26, capacitors 36, relays 72, 78, 84 and instrumentalities 90 and 92 into a package and mount it in or near the cabinet 120. As compared to this very simple installation, Figures 6 and 7 demonstrate that if wheel-connected tachometers are to be employed, in accordance with presently known systems, additional wiring indicated by dash lines 122 is required. Obviously, this additional circuitry must run from the control and terminal panel through the flexible mounting between the locomotive and the trucks and to the wheels.

Another very important aspect of the present invention is that wheel slip and slide is detected from the moving parts of the driving motors and not from the wheels. It so happens that for sound design reasons locomotive driving motors are connected to the gearing which drives the wheels, only by a taper fit between a pinion and the motor shaft, without any keying. Sometimes this taper fit slips and a motor will spin without resulting spin of the wheels. A wheel-connected tachometer unbalance system would not reflect this malfunction.

The foregoing detailed description of the invention has been made only for purposes of explanation. The true scope of the invention is to be determined from the appended claims.

What is claimed is:

1. Apparatus for the detection of speed irregularities between group-operated primary driving electrical machines which may consume or deliver electrical energy comprising, means coupled to the electrical circuit of each machine for obtaining a ripple voltage, relator means coupled to each ripple voltage obtaining means for generating at an output thereof a voltage proportionate to the frequency of the ripple voltage, means interconnecting the output of each relator means to the outputs of the other relator means, and means included in the interconnecting means for actuating a responsive means whenever the outputs of the relator means differ with respect to one another.

2. Apparatus as in claim 1 wherein the voltage output of the relator means is a voltage proportionate in amplitude to the frequency of the ripple voltage.

3. Apparatus as in claim 1 wherein the machines are mechanically coupled to driving wheels of a railroad locomotive to drive the locomotive.

4. A railway locomotive having a plurality of trucks attached thereto, each truck having a plurality of wheels mounted thereon, a plurality of primary driving electrical motors each coupled to at least one set of wheels on each truck, a control cabinet positioned in the locomotive, leads running from each motor to said cabinet, and a wheel speed detection circuit mounted in said cabinet, the speed detection circuit comprising a means coupled to the leads of each motor at the lead terminals in control cabinet for obtaining a ripple voltage, relator means coupled to each ripple voltage obtaining means for generating at an output thereof a voltage proportionate to the frequency of the ripple voltage, means interconnecting the outputs of each relator means to the outputs of the other relator means, and means included in the interconnecting means for activating responsive means wherever the outputs of the relator means differ with respect to one another.

5. Apparatus as in claim 1 wherein the interconnecting means includes a plurality of relays each having an operating coil, each coil being connected in a circuit extending between at least two relator output means, the arrangement being such that a difference in output between any two relator means will energize at least one relay operating coil to operate the relay.

References Cited in the file of this patent

UNITED STATES PATENTS

| | | |
|---|---|---|
| 2,176,742 | La Pierre | Oct. 17, 1939 |
| 2,371,832 | Lillquist | Mar. 20, 1945 |
| 2,652,555 | Smith | Sept. 15, 1953 |